(12) United States Patent
Mohassel et al.

(10) Patent No.: US 10,461,932 B2
(45) Date of Patent: Oct. 29, 2019

(54) METHOD AND SYSTEM FOR DIGITAL SIGNATURE-BASED ADJUSTABLE ONE-TIME PASSWORDS

(71) Applicant: Yahoo Holdings, Inc., Sunnyvale, CA (US)

(72) Inventors: Payman Mohassel, San Jose, CA (US); Juan Garay, San Francisco, CA (US); Xiong Fan, Ithaca, NY (US)

(73) Assignee: Oath Inc., New York, NY (US)

( * ) Notice: Subject to any disclaimer, the term of this patent is extended or adjusted under 35 U.S.C. 154(b) by 218 days.

(21) Appl. No.: 15/063,752

(22) Filed: Mar. 8, 2016

(65) Prior Publication Data

US 2017/0264436 A1    Sep. 14, 2017

(51) Int. Cl.
| | |
|---|---|
| *H04L 9/32* | (2006.01) |
| *H04L 9/08* | (2006.01) |
| *H04L 29/06* | (2006.01) |

(52) U.S. Cl.
CPC ............ *H04L 9/321* (2013.01); *H04L 9/0861* (2013.01); *H04L 9/0866* (2013.01); *H04L 9/0872* (2013.01); *H04L 9/3228* (2013.01); *H04L 9/3247* (2013.01); *H04L 63/0838* (2013.01); *H04L 63/123* (2013.01)

(58) Field of Classification Search
CPC ..... H04L 9/321; H04L 9/3228; H04L 9/0861; H04L 9/3234
See application file for complete search history.

(56) References Cited

U.S. PATENT DOCUMENTS

| | | | | | |
|---|---|---|---|---|---|
| 5,825,880 | A | * | 10/1998 | Sudia ...................... | G06F 21/40 |
| | | | | | 380/286 |
| 9,105,027 | B2 | * | 8/2015 | Hammad ................ | G06F 21/34 |
| 9,722,996 | B1 | * | 8/2017 | Kolman ................ | H04L 63/083 |
| 2004/0249503 | A1 | * | 12/2004 | Sanchez .................. | G06F 21/42 |
| | | | | | 700/237 |
| 2005/0021982 | A1 | * | 1/2005 | Popp .................... | G06Q 20/341 |
| | | | | | 713/184 |
| 2007/0058814 | A1 | * | 3/2007 | Robinson .............. | H04L 9/0662 |
| | | | | | 380/280 |
| 2007/0266257 | A1 | * | 11/2007 | Camaisa ............. | H04L 63/0838 |
| | | | | | 713/182 |
| 2009/0031407 | A1 | * | 1/2009 | Kuang .................... | G06F 21/31 |
| | | | | | 726/7 |

(Continued)

*Primary Examiner* — Chau Le
*Assistant Examiner* — Vance M Little
(74) *Attorney, Agent, or Firm* — Pillsbury Winthrop Shaw Pittman LLP

(57) ABSTRACT

The present teaching relates to adjustable one-time password (OTP) setup, sign-in, and verification. In one example, a first length of a signature is determined. The signature has been used previously by a first user to initially sign in a second device. A second length that is different from the first length is determined. A signing key is generated based at least partially on the second length. A new signature having the second length is generated based on the signing key. The new signature is provided to a second user so that the second user can input at least a portion of the new signature into the second device for a subsequent sign in. The verification key is generated based at least partially on the new signature. The new signature input by the second user into the second device is transmitted from the second device to the third device.

31 Claims, 12 Drawing Sheets

(56) References Cited

U.S. PATENT DOCUMENTS

| | | | | |
|---|---|---|---|---|
| 2011/0289576 | A1* | 11/2011 | Cheng | G09C 1/00 726/9 |
| 2012/0323717 | A1* | 12/2012 | Kirsch | G06Q 20/0855 705/26.1 |
| 2013/0171967 | A1* | 7/2013 | Ashour | H04M 1/7253 455/411 |
| 2013/0298223 | A1* | 11/2013 | Li | G06F 21/46 726/18 |
| 2014/0189359 | A1* | 7/2014 | Marien | H04L 9/3228 713/172 |
| 2014/0208386 | A1* | 7/2014 | Sama | H04L 63/14 726/4 |
| 2014/0250490 | A1* | 9/2014 | Baca | H04L 9/3228 726/1 |
| 2014/0337615 | A1* | 11/2014 | Tomkow | H04L 63/0428 713/153 |
| 2015/0195280 | A1* | 7/2015 | Toyonaga | H04L 63/123 713/155 |
| 2016/0050209 | A1* | 2/2016 | Govande | H04L 63/101 726/7 |
| 2017/0034158 | A1* | 2/2017 | Ekambaram | H04L 63/0846 |

* cited by examiner

METHOD AND SYSTEM FOR DIGITAL SIGNATURE-BASED ADJUSTABLE ONE-TIME PASSWORDS

BACKGROUND

1. Technical Field

The present teaching relates to methods, systems, and programming for cryptography. Particularly, the present teaching is directed to methods and systems of digital signature-based adjustable one-time password (OTP) setup, sign-in, and verification for identity verification.

2. Discussion of Technical Background

As the Internet grows and personal devices (e.g., desktop computers, laptop computers, smart phones, etc.) have become widely available, a desirable cryptographic system is critical to prevent from hacking of the personal devices and/or application programs installed on the personal devices (such as emails, online shopping applications, personal banking applications, etc.). One example of the cryptographic system is based on a one-time password (OTP) scheme. In an OTP cryptographic system, a user holds a setup tool (e.g., a security token) that generates a message and enters the generated message in an application installed in a client device (e.g., a smart phone, a laptop computer, a desktop computer, etc.) with an attempt to log in the application on the client device. After obtaining the message from the user, the client device sends the message to a server for verification. The server verifies the message and informs the client device whether the message passes the verification or not. The user can sign in the application when the message that the user enters passes the verification, and cannot sign in the application when the message fails the verification. In the OTP cryptographic system, the message generated by the setup tool can only be used for one time.

The existing OTP cryptographic system is susceptible to data breach activities by hackers due to a symmetric-key configuration. In particular, both the setup tool and the server store the same key (e.g., the symmetric key) for message generation and verification. A hacker may obtain the same key by hacking the server and generate the correct message using the obtained key. This, as a result, makes the cryptographic system ineffective.

Therefore, there is a desire to develop a secure OTP cryptographic system insusceptible to the data breach activities by hackers.

SUMMARY

The present teaching relates to methods and systems, and programming for cryptography. Particularly, the present teaching is directed to methods and systems of digital signature-based adjustable one-time password (OTP) setup, sign-in, and verification for identity verification.

In one example, a method, implemented on a machine having at least one processor, storage, and a communication platform connected to a network for identity verification is disclosed. A first length of a signature is determined. The signature has been used previously by a first user to initially sign in a second device. A second length that is different from the first length is determined. A signing key is generated based at least partially on the second length. A new signature having the second length is generated based on the signing key. The new signature is provided to a second user so that the second user can input at least a portion of the new signature into the second device for a subsequent sign in. The verification key is generated based at least partially on the new signature. The verification key is transmitted to a third device to enable the third device to verify the second user based at least partially on the verification key and the at least a portion of the new signature input by the second user into the second device. The new signature input by the second user into the second device is transmitted from the second device to the third device.

In another example, a method, implemented on a machine having at least one processor, storage, and a communication platform connected to a network for identity verification is disclosed. A first length of a signature generated by a second device based on a signing key is obtained at a first device. A second length is determined based on the first length. A portion of the signature is received from a user having a second length. The portion of the signature is transmitted to a third device to enable the third device to verify the user based on a verification key provided by the second device and the portion of the signature.

In yet another example, a method, implemented on a machine having at least one processor, storage, and a communication platform connected to a network for identity verification is disclosed. A verification key is received from a second device at a first device. The verification key is generated by the second device based at least partially on a first signature, and the first signature is generated by the second device and provided to a user. A second signature having a first length in accordance with the first signature is received from a third device. The second signature is input by the user to the third device. A checker is calculated based on the verification key and a second length determined in accordance with the first length. The checker is compared with at least a portion of the second signature to generate a comparison result, wherein the at least a portion of the second signature has the second length. A verification result is generated based on the comparison result.

In yet another example, a system for identity verification is disclosed. The system comprises a signature length determiner and a setup unit. The signature length determiner configured for determining a first length of a signature, wherein the signature has been used previously by a first user to initially sign in a first device, and determining a second length that is different from the first length. The setup unit configured for generating a signing key based at least partially on the second length, generating a new signature having the second length based on the signing key, providing the new signature to a second user so that the second user can input at least a portion of the new signature into the first device for a subsequent sign in, generating a verification key based at least partially on the new signature, and transmitting the verification key to a second device to enable the second device to verify the second user based at least partially on the verification key and the at least a portion of the new signature input by the second user into the first device. The new signature input by the second user into the first device is transmitted from the first device to the second device.

Other concepts relate to software for implementing the present teaching on utility verification. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, a machine-readable tangible and non-transitory medium having information for utility verification is disclosed. The information, when read by the machine, causes the machine to perform the following. A first length of a signature is determined. The signature has been used previously by a first user to initially sign in a second device. A second length that is different from the first length is determined. A signing key is generated based at least partially on the second length. A new signature having the second length is generated based on the signing key. The new signature is provided to a second user so that the second user can input at least a portion of the new signature into the second device for a subsequent sign in. The verification key is generated based at least partially on the new signature. The verification key is transmitted to a third device to enable the third device to verify the second user based at least partially on the verification key and the at least a portion of the new signature input by the second user into the second device. The new signature input by the second user into the second device is transmitted from the second device to the third device.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

Figure 1:
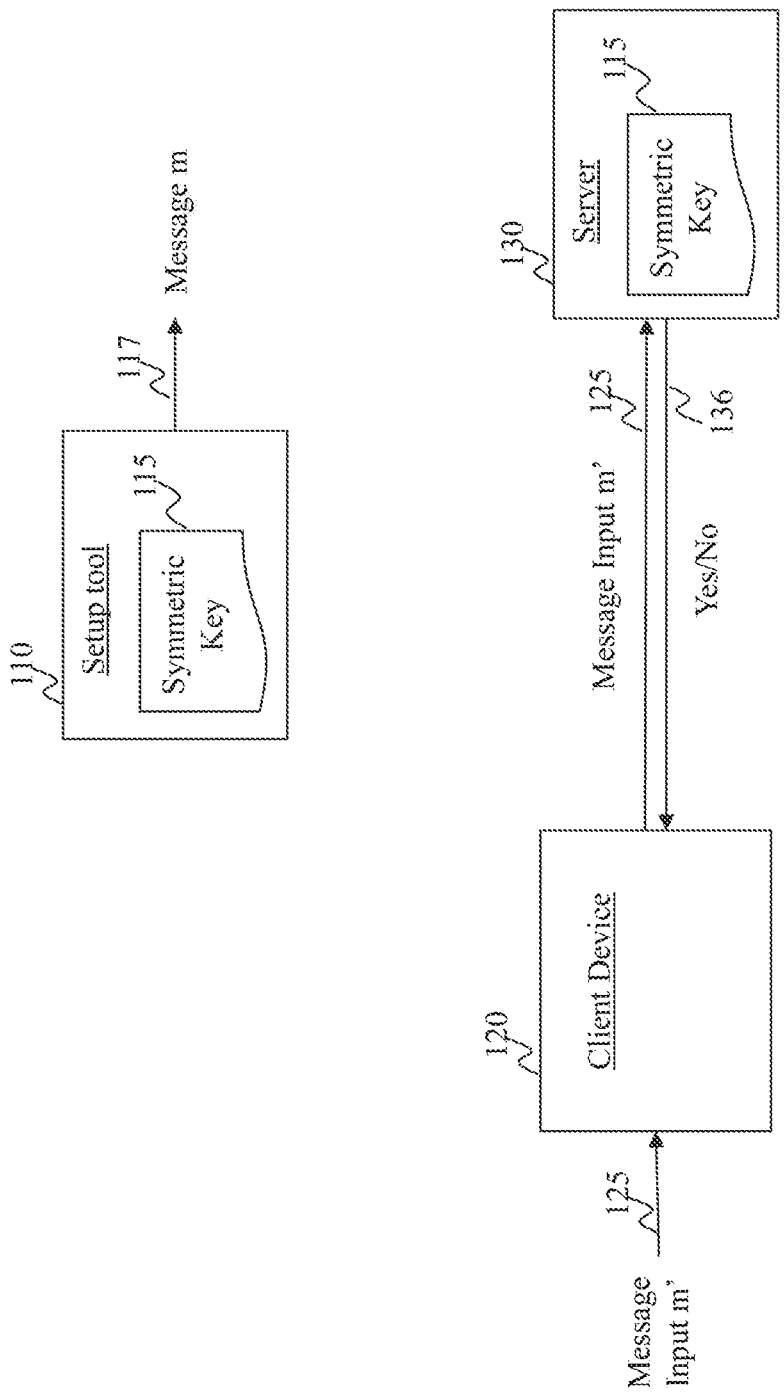
FIG. 1 illustrates an example of an existing one-time password (OTP) cryptographic system based on a symmetric-key configuration.

FIG. 1 illustrates an example of an existing one-time password (OTP) cryptographic system based on a symmetric-key configuration. As shown, the OTP cryptographic system includes a setup tool 110, a client device 120, and a server 130. Both the setup tool 110 and the server 130 stores the same symmetric key 115 used for message generation and verification. The setup tool 110 may be a smartphone, a security token, or any other communication device configured to generate a message m 117 that may be used to sign in the client device 120. It should be noted that signing in the client device 120 may mean signing in the client device 120 itself and/or signing in an application installed in the client device 120 throughout this text. In some examples, the setup tool 110 may be a computer application installed in the client device 120.

The client device 120 may be a smart phone, a laptop computer, a desktop computer, or any other computing device. In order to sign in the client device or an application installed in the client device 120, a user enters a message input m' 125. Upon receipt of the message input m' 125, the client device 120 transmits the message input m' to the server 130 to verify whether the message input m' 125 matches the message 117.

The server 130 may be one or more computers in communication with the client device 120. The server 130 is configured to verify whether the message input m' 125 matches the message m 117 and informs the client device 120 of a verification decision 136. In particular, the server 130 may generate a new message using the symmetric key 115 in a similar manner as the setup tool 110. Following generation of the new message, the server 130 compares the new message with the message input m' 125. When the new message matches the message input m' 125, the server 130 transmits a verification decision 136 indicating that the user is allowed to sign in the client device 120 or the application installed in the client device 120. On the contrary, when the new message does not match the message m' 125, the server 130 transmits the verification decision 136 indicating that the user is not allowed to sign in the client device 120 or the application installed in the client device 120.

A major drawback of the existing OTP cryptographic system as shown in FIG. 1 is its susceptibility to the data breach of the server 130 by hackers, which is very common nowadays. In particular, when a hacker hacks the server 130 and obtains the symmetric key 115 stored in the server, the hacker may generate the correct message (i.e., a password) that can be used to sign in the client device or the application installed the client device without the use of the setup tool 110. As such, a data breach of the server 130 would make the OTP cryptographic system as shown in FIG. 1 ineffective.

Figure 2:
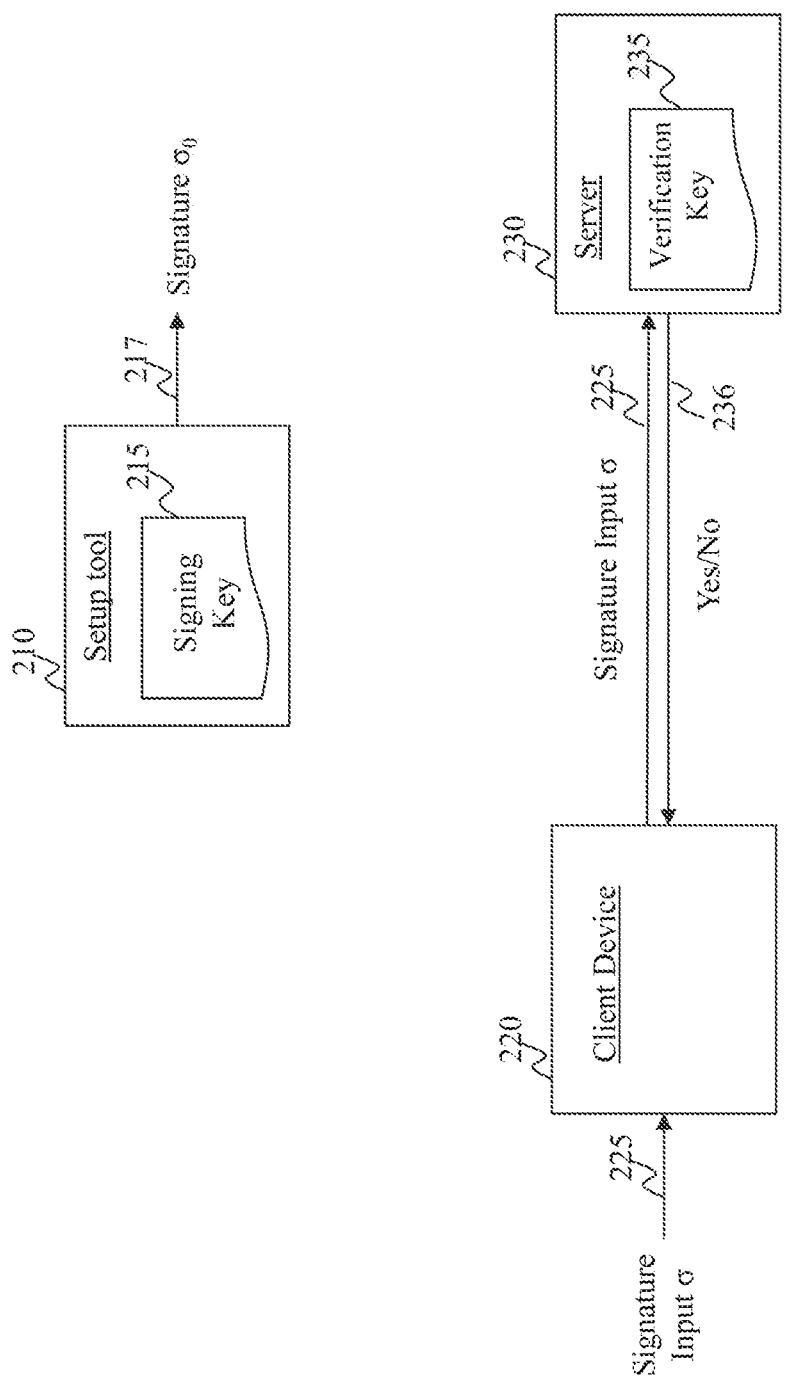
FIG. 2 illustrates an example of an OTP cryptographic system based on an asymmetric-key configuration.

An OTP cryptographic system based on an asymmetric-key configuration as illustrated in FIG. 2 may solve the abovementioned problem in FIG. 1. The OTP cryptographic system in FIG. 2 includes a setup tool 210, a client device 220, and a server 230, which are similar to the setup tool 110, the client device 120, and the server 130 as shown in FIG. 1. However, instead of storing the same key (e.g., the symmetric key 115), the setup tool 210 and the server 230 stores different keys for signature generation and verification, respectively. In particular, the setup tool 210 stores a signing key 215 used to generate a signature $\sigma_0$ 217 for signing in the client device 220 or the application installed in the client device 220. On the other hand, the server 230 stores a verification key 235 used to determine a verification decision 236 by evaluating the signature input $\sigma$ 225. Unlike the symmetric key 115 stored in the server 130 in FIG. 1, the verification key 235 stored in the server 230 cannot be used by any means to generate the signature $\sigma_0$ 217. As such, a hacker cannot generate the signature $\sigma_0$ 217 without using the setup tool 210 even if the hacker hacks the server 230 and obtains the verification key 235. As a result, the OTP cryptographic system in FIG. 2 is insusceptible to the data breach of the server by the hackers.

However, the predetermined length of the signature $\sigma_0$ 217 generated by the setup tool 210 can be very long to ensure a reasonable level of security. For example, the signature $\sigma_0$ 217 may be at least 160-bit (20 characters) long. Further, the user must enter the whole signature in the sign-in process, and the server must verify the whole signature in the verification process. These limitations make the OTP cryptographic system in FIG. 2 less flexible and inconvenient in use for users.

The present teaching relates to methods and systems, and programming for cryptography. Particularly, the present teaching is directed to methods and systems of digital signature-based adjustable OTP setup, sign-in, and verification for identity verification. In addition, the OTP cryptographic system in the present teaching is insusceptible to data breach.

A user may want to log on a client device or an application installed in the client device with a signature (i.e., a password). In order to obtain the correct signature, the user may operate a setup tool to generate the signature.

In the present teaching, the length of the signature generated by the setup tool ("signature length $L_1$") may be adjustable, i.e., the signatures generated by the setup tool at different times may have different lengths. Further, the signature length $L_1$ may be short while ensuring a certain security level. Following receipt of the signatures generated by the setup tool, a user may provide a signature input in the client device to sign in the client device. It should be noted that throughout the text, signing in the client device may mean signing in the client device and/or an application installed in the client device. The length of the signature input ("sign-in length $L_2$") may be adjustable, i.e., the user may enter a different portion of the signature generated by the setup tool to sign in the client device or the application installed in the client device at a different time. Upon receipt of the signature input, the client device transmits the signature input to the server for verification. The length of the signature input for verification ("verification length $L_3$") may be adjustable, i.e., the server may verify different portions of the signature input to make verification decisions at different times. Although the signature length $L_1$, the sign-in length $L_2$, and the verification length $L_3$ are all adjustable, they cannot be adjusted at once. In some examples, the setup tool and the client device are separate computing devices. In some examples, the setup tool is a computer application program installed in the client device.

The OTP cryptographic system in the present teaching is insusceptible to data breach by hackers based on the asymmetric-key configuration. This is because, even if the hacker obtains the verification key by hacking the server, the hacker still cannot obtain the correct signature to sign in the client device or the application installed in the client device using the verification key. Therefore, the OTP cryptographic system in the present teaching is flexible and convenient in use for the users.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

Figure 3:
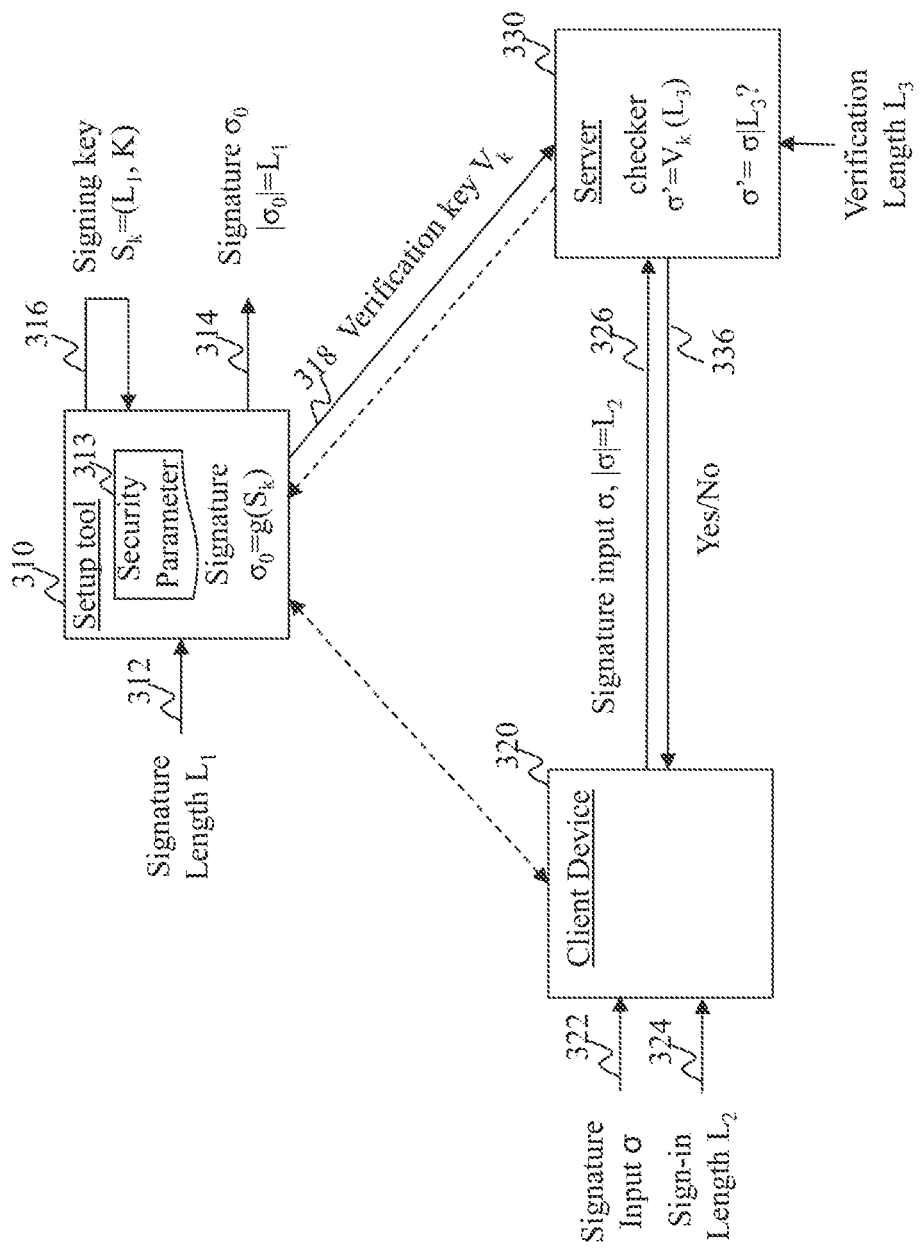
FIG. 3 illustrates an example of an OTP cryptographic system based on an adjustable OTP setup, sign-in, and verification scheme, according to an embodiment of the present teaching.

FIG. 3 illustrates an example of an OTP cryptographic system based on an adjustable OTP setup, sign-in, and verification scheme, according to an embodiment of the present teaching. As shown in FIG. 3, the OTP cryptographic system includes a setup tool 310, a client device 320, and a server 330, which are similar to the setup tool 110, the client device 120, and the server 130. In some examples, the setup tool 310 and the client device 320 are separate computing devices as shown in FIG. 3. In some examples, the setup tool 310 may be a computer application program installed in the client device 320. The client device 320, and the server 330 of the OTP cryptographic system in FIG. 3 may be in communication with each other through a network, for example, a local area network (LAN), a wide area network (WAN), a public network, a private network, a proprietary network, a Public Telephone Switched Network (PTSN), the Internet, a wireless network, a virtual network, or any combination thereof.

In operation, the setup tool 310 may store a security parameter $\lambda$ set by an information technology (IT) administrator of the client device 320 and/or the application installed in the client device 320. The security parameter $\lambda$ relates to a length corresponding to a certain security level. By default, the signature length $L_1$ may be equal to the security parameter $\lambda$. However, the signature length $L_1$ may be different from the length of a signature that has been used previously by a previous user to initially sign in the client device or the application installed in the client device. As such, the signature length $L_1$ is adjustable at the setup tool 310. For example, the setup tool 310 may request a user to determine the signature length $L_1$ around the value of the security parameter $\lambda$ every time before generating a signature $\sigma_0$ (i.e., a password) 314 used to sign in the client device 320 or the application installed in the client device 320. Alternatively, the setup tool 310 may execute a computer program (e.g., a machine learning process) to adjust the signature length $L_1$. In one embodiment, the client device 320 may adjust the signature length $L_1$ based on the security parameter $\lambda$ and a current location of the client device 320. The current location of the client device 320 may be obtained from the client device 320. For example, if the user is operating the client device 320 in a place with a large population of potential hackers, the setup tool 310 may increase the signature length $L_1$. Otherwise, the setup tool 310 may decrease the signature length $L_1$. In one embodiment, the setup tool 310 may adjust the signature length $L_1$ based on the security parameter λ and a sign-in report of the client device 320 or the application installed in the client device 320. The sign-in report may be obtained from the server 330. If the sign-in report indicates the client device 320 or the application installed in the client device 320 have been hacked recently, the setup tool 310 may increase the signature length $L_1$. Otherwise, the setup tool 310 may decrease the signature length $L_1$.

Upon determination of the signature length $L_1$, the setup tool 310 can execute a setup algorithm to generate a signing key $S_k$. The signing key $S_k$ may include the signature length $L_1$ and a random key, K, for a pseudorandom function. Based on the signing key $S_k$, the setup tool 310 may generate a signature $\sigma_0$ having the signature length $L_1$. For example, the signature $\sigma_0$ may be expressed by $\sigma_0=g(S_k)$, where g is a pseudorandom function. After determination of the signature $\sigma_0$, the setup tool 310 may provide the signature $\sigma_0$ to a user so that the user may input at least a portion of the signature $\sigma_0$ to sign in the client device 320 or the application installed in the client device 320. For example, the setup tool 310 may display the signature $\sigma_0$ on a display screen of the setup tool 310. In addition or alternatively, the setup tool 310 may transmit the signature $\sigma_0$ via an electronic mail (E-mail), a text message, a voice mail, or any combination thereof.

The setup tool 310 may further generate the verification key $V_k$ 318 and transmits the verification key $V_k$ 318 to the server 330. The verification key $V_k$ may be an obfuscation of a computer program in table 1. An obfuscation of an object is an encrypted version of the object so that the object is hidden from the outsider (e.g., a hacker). For example, when the verification key $V_k$ is an obfuscation of the computer program in table 1, the hacker cannot obtain the computer program even though the hacker may obtain the verification key $V_k$. However, the server 330 may be able to decrypt the obfuscation of the computer program to obtain the computer program for verification.

Optionally, the setup tool 310 may further transmit the signature length $L_1$ to the client device 320 based on which the client device 320 may determine the sign-in length $L_2$ before receiving a signature input σ.

TABLE 1

| A computer program |
| --- |
| Hardcoded: Signing key $S_k = (L_1, K)$.<br>Input: A signature/verification length pair (σ, $L_3$)<br>"Yes" if $\sigma = g(S_k, L_3)$, otherwise, "No" |

After the signature $\sigma_0$ is provided to the user, the client device 320 may receive a signature input σ 322 from the user and determine a sign-in length $L_2$ 324 before or after receipt of the signature input σ 322. By default, the sign-in length $L_2$ 324 may be equal to the signature length $L_1$ 312. However, the sign-in length $L_2$ 324 may be adjustable, i.e., the length of the signature input σ, may be different from time to time when it is entered to the client device 320. Accordingly, the signature input σ 322 may be the whole signature $\sigma_0$ (i.e., when $L_2=L_1$) or a portion of the signature $\sigma_0$ (i.e., when $L_2<L_1$) in order to sign in the client device 320 or the application installed in the client device 320. As described above, the sign-in length $L_2$ 324 may be adjusted (i.e., $L_2<L_1$) when the signature length $L_1$ 312 is not adjusted (i.e., $L_1=k$).

In one embodiment, the client device 320 may receive the signature input σ 322 by the user, whose length is no greater than the signature length $L_1$. Following receipt of the signature input σ 322, the client device 320 may determine the sign-in length $L_2$ based on the signature input σ 322. The client device 320 may further transmit the signature input σ 322 and optionally the sign-in length $L_2$ to the server 330 to enable the server to verify the identity of the user.

In one embodiment, the client device 320 may display the signature length $L_1$ (obtained from the setup tool 310) and request a user to determine the sign-in length $L_2$ ($L_2 \leq L_1$). Upon receipt of the sign-in length $L_2$, the client device 320 may further request the user to enter the signature input σ corresponding to the sign-in length $L_2$, for example, the first $L_2$ bits or characters of the signature $\sigma_0$, the last $L_2$ bits or characters of the signature $\sigma_0$, or other portion of the signature $\sigma_0$ according to a predetermined rule.

In another embodiment, the client device 320 may determine the sign-in length $L_2$ based on the signature length $L_1$ (obtained the setup tool 310) and a current location of the client device 320. For example, if the user is operating the client device 320 in a country with a large population of hackers, the client device 320 may increase the sign-in length $L_2$. Otherwise, the client device 320 may decrease the sign-in length $L_2$.

In yet another embodiment, the client device 320 may determine the sign-in length $L_2$ based on the signature length $L_1$ (obtained from the setup tool 310) and a sign-in report of the client device 320 or the application installed in the client device 320. If the sign-in report indicates the client device 320 or the application installed in the client device 320 are hacked recently, the client device 320 may increase the sign-in length $L_2$. Otherwise, the client device 320 may decrease the sign-in length $L_2$.

After the sign-in length $L_2$ is determined, the client device 320 may provide the sign-in length $L_2$ to the user, for example, by displaying the sign-in length $L_2$ via a display on the client device 320. Additionally or alternatively, the client device 320 may transmit the sign-in length $L_2$ to the user through an email, a text message, a voice mail, or any combination thereof. Then the client device 320 may request the user to enter the signature input σ 322 corresponding to the sign-in length $L_2$. Following receipt of the signature input σ 322, the client device 320 may transmit the signature input σ 322, and optionally the sign-in length $L_2$ to the server 330 to enable the server 330 to verify the identity of the user.

Following receipt of the signature σ and optionally the sign-in length $L_2$ 324 from the client device 320, the server 330 may determine a verification length $L_3$ ($L_3 \leq L_2$). By default, the verification length $L_3$ may be equal to the sign-in length $L_2$, i.e., the length of the signature σ from the client device 320. However, the verification length $L_3$ may also be adjustable, i.e., the server 330 may verify a different portion of the signature input σ 322 to make a verification decision 336 at a different time. As described above, the verification length $L_3$ may only be adjusted when neither the signature length $L_1$ nor the sign-in length $L_2$ is adjusted (e.g., when $L_1=L_2=\lambda$).

In an embodiment, the verification length $L_3$ may be adjusted by the IT administrator of the client device 320 and/or the application installed in the client device 320. In an embodiment, the server 330 may adjust the verification length $L_3$ based on the sign-in length $L_2$ and a current location of the client device 320. For example, if the user is operating the client device 320 in a place with a large population of hackers, the server 330 may increase the verification length $L_3$. Otherwise, the server 330 may decrease the verification length $L_3$. In one embodiment, the server 330 may adjust the verification length $L_3$ based on the sign-in length $L_2$ and the sign-in report of the client device 320 or the application installed in the client device 320. If the sign-in report indicates the client device 320 or the application installed in the client device 320 are hacked recently, the server 330 may increase the verification length $L_3$. Otherwise, the server 330 may decrease the verification length $L_3$. After the verification length $L_3$ is determined, the server 330 may calculate a checker σ' based on the verification key 318 and the verification length $L_3$. For example, the checker σ' may be calculated according to the verification key $V_k$ by σ'=$V_k(L_3)$=g($S_k$)|$L_3$, where |$L_3$ indicates the check σ' has a length of $L_3$.

To verify the signature input σ 322, the server 330 compare the checker σ' and σ|$L_3$, where σ|$L_3$ may be a portion of the signature σ with a length of $L_3$ (e.g., when $L_3$<$L_2$). In some other examples, σ|$L_3$ may represent the whole signature σ (e.g., when $L_3$=$L_2$). Corresponding to determination of the signature input σ from the signature $σ_0$, the portion of the signature σ, i.e., σ|$L_3$, may be the first $L_3$ bits or characters of the signature σ, or any other suitable portion of the signature σ according to the predetermined rule. When the checker σ' matches σ|$L_3$, the server 330 may transmit a verification decision to the client device 320 indicating the user passes the identity verification. Then the user is allowed to log in the client device 320 or the application installed on the client device 320. Otherwise, the server 330 may transmit the verification decision to the client device 320 indicating the user fails the identity verification. Then the user is not allowed to log in the client device 320 or the application installed on the client device 320. Optionally, the client device 320 may request the user to enter the signature input σ 322 again for verification. In some examples, the client device 320 may adjust the sign-in length $L_2$ (e.g., increase the sign-in length $L_2$), and requests the user to enter a new signature input with the adjusted sign-in length $L_2$.

Figure 4:
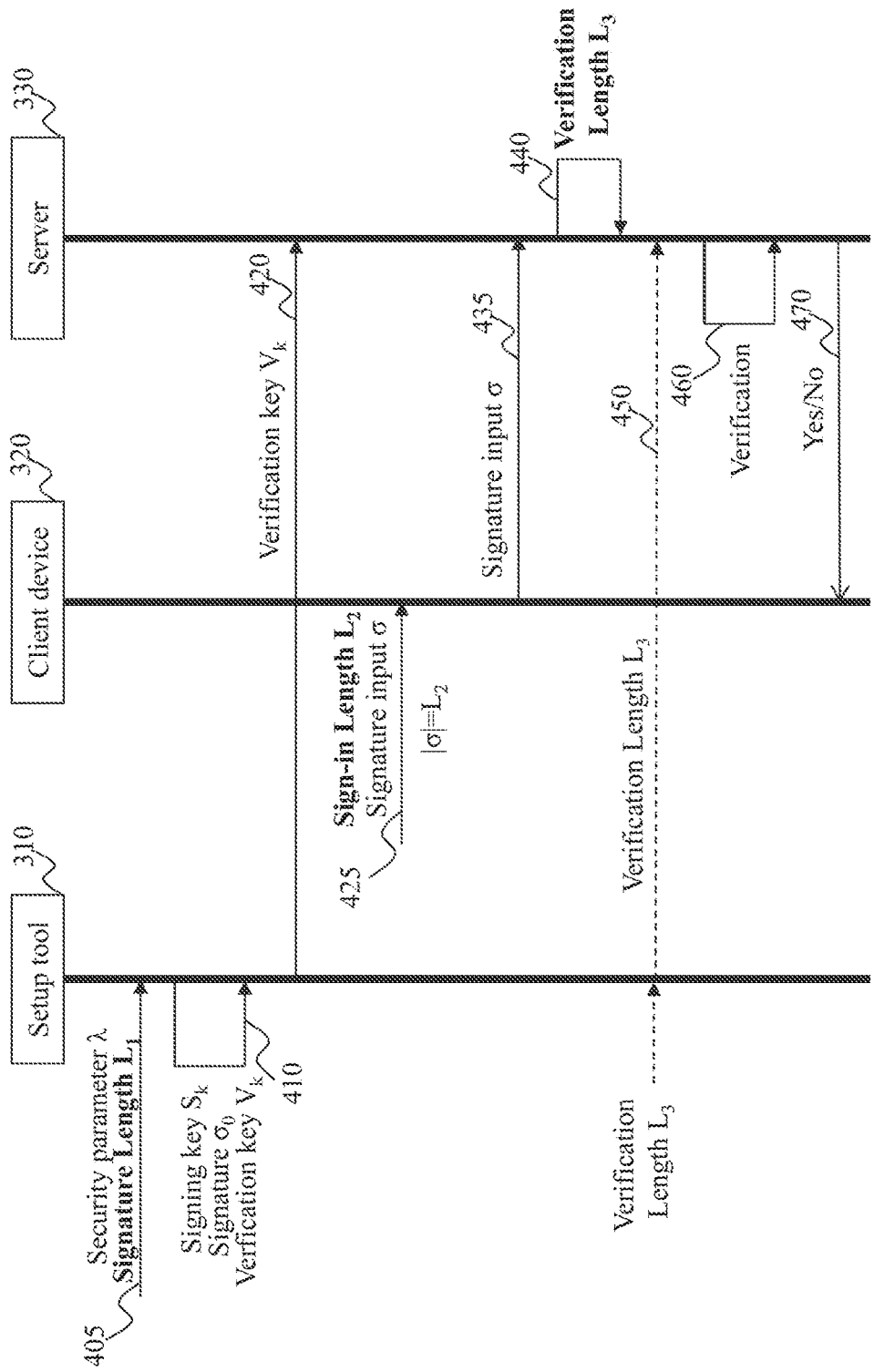
FIG. 4 illustrates a sequential diagram of an adjustable OTP setup, sign-in, and verification scheme, according to an embodiment of the present teaching.

FIG. 4 illustrates a sequential diagram of an adjustable OTP setup, sign-in, and verification scheme, according to an embodiment of the present teaching. The sequential diagram in FIG. 4 shows communications between the setup tool 310, the client device 320, and the server 330 through the network as described above in an OTP setup stage, an OTP sign-in stage, and an OTP verification stage.

In the OTP setup stage, the setup tool 310 obtains a security parameter λ from an IT administrator of the client device 320 and/or the application installed in the client device 320 at step 405. The setup tool 310 may further determine the signature length $L_1$ based on the security parameter λ. By default, the signature length $L_1$ may be equal to the security parameter λ. However, the signature length $L_1$ may be adjustable. For example, the setup tool 310 may further receive a signature length $L_1$ ($L_1$≤λ) from a user at step 405. Alternatively, the setup tool 310 may execute a computer program (e.g., a machine learning algorithm) to adjust the signature length $L_1$ automatically. In an embodiment, the setup tool 310 may adjust the signature length $L_1$ based on the security parameter λ and the current location of the client device 320. The current location of the client device 320 may be obtained from the client device 320. In another embodiment, the setup tool 310 may adjust the signature length $L_1$ based on the security parameter λ and the sign-in report of the client device 320 and/or the application installed in the client device 320. The sign-in report may be obtained from the server 330.

Following determination of the signature length $L_1$, the setup tool 310 executes a setup algorithm to generate a signing key $S_k$, a signature $σ_0$, and a verification key $V_k$ at step 410. The signing key $S_k$ includes the signature length $L_1$ and a random key, K, for a pseudorandom function. The signature $σ_0$ is generated based on the signing key $S_k$. For example, the signature $σ_0$ may be calculated as g($S_k$), where g is a pseudorandom function. After the signature $σ_0$ is generated, the setup tool 310 may provide the signature $σ_0$ to a user so that the user may input at least a portion of the signature $σ_0$ to sign in the client device 320 or the application installed in the client device. The verification key $V_k$ is an obfuscation of a computer program as shown in table 1. At step 420, the setup tool 310 may transmit the verification key $V_k$ to the server 330.

In the OTP sign-in stage, the client device 320 receives a signature input σ and determine the sign-in length $L_2$ before or after receipt of the signature input σ at step 425. Optionally, the client device 320 may receive the signature length $L_1$ from the setup tool 310. By default, the sign-in length $L_2$ is equal to the signature length $L_1$. However, the sign-in length $L_2$ may be adjusted when the signature length $L_1$ is not adjusted (e.g., $L_1$=λ). As described above, the client device 320 may receive the signature input σ and optionally, determine the sign-in length $L_2$ as the length of the signature input σ. Alternatively, the client device 320 may executive a computer algorithm (e.g., a machine learning algorithm) to determine the sign-in length $L_2$ and requests the user for the signature input σ with a length of $L_2$.

Various methods may be used to determine the sign-in length $L_2$. For example, the client device 320 may adjust the sign-in length $L_2$ based on the signature length $L_1$, and the current location of the client device 320. For another example, the client device 320 may determine the sign-in length $L_2$ based on the signature length $L_1$ and the sign-in report of the client device 320 and/or the application installed in the client device 320. At step 435, the client device 320 may transmit the signature σ and optionally the sign-in length $L_2$ to the server 330 for identity verification.

In the verification stage, following receipt of the verification key $V_k$ and the signature input σ, the server 330 may determine the verification length $L_3$ based on the sign-in length $L_2$ (which may be received directly from the client device 320 or implied by the length of the signature σ from the client device 320). By default, the verification length $L_3$ is equal to the sign-in length $L_2$. However, the verification length $L_3$ may be adjusted when neither the signature length $L_1$ nor the sign-in length $L_2$ is adjusted (i.e., $L_1$=$L_2$=λ).

In one embodiment, the server 330 may determine the verification length $L_3$ by itself based on the sign-in length $L_2$ at step 440. For example, the server 330 may determine the verification length $L_3$ corresponding to the current location of the client device 320. Alternatively, the server 330 may determine the verification length $L_3$ corresponding to the sign-in report of the client device 320 and/or the application installed in the client device 320 as described above.

In another embodiment, at step 450, the setup tool 310 may determine the verification length $L_3$ following receipt of an input, for example, by the IT administrator of the client device 320 or the application installed in the client device 320 from the setup tool 310.

At step 460, the server 330 verifies the identity of the user who provides the signature input σ to the client device 320 based on the signature input σ and the verification key $V_k$ after the verification length $L_3$ is determined. Specifically, the server 330 may calculate a checker σ' according to the verification key $V_k$. In an embodiment, the checker σ' may be calculated as σ'=$V_k(L_3)$=$g(S_k)|L_3$. The server 330 then compare the checker σ' and at least a portion of the signature σ having a length of $L_3$ (e.g, the first $L_3$ bits or characters of the signature σ, the last $L_3$ bits or characters of the signature σ, or any other $L_3$ bits or characters of the signature σ according to a predetermined rule corresponding to the determination of the signature input σ from the signature $σ_e$). When the checker σ' matches the at least a portion of the signature σ, the server 330 transmits a verification decision "Yes" to the client device 320 indicating the user passes identity verification at step 470. Then the user may log in the client device 320 or the application installed in the client device 320. Otherwise, the server 330 transmits a verification decision "No" to the client device 320 indicating the user fails the identity verification at step 470. The user is then not allowed to log in the client device 320, and may be asked to enter a new signature input with an adjusted sign-in length $L_2$ if the user wants to try again.

Figure 5:
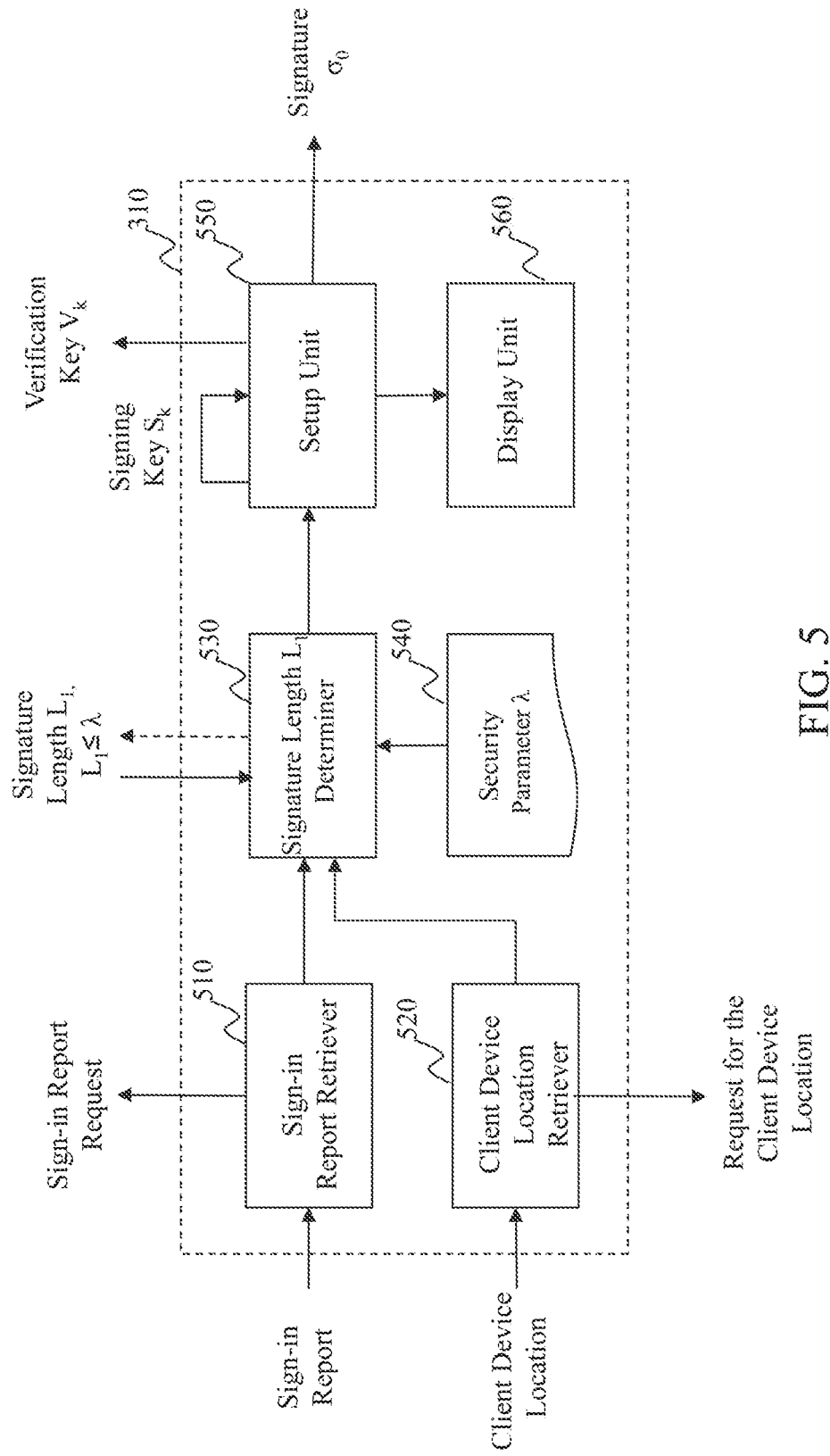
FIG. 5 illustrates a diagram of a setup tool, according to an embodiment of the present teaching.

FIG. 5 illustrates a diagram of a setup tool 310, according to an embodiment of the present teaching. As shown in FIG. 5, the setup tool 310 in this example includes a sign-in report retriever 510, a client device location retriever 520, a signature length $L_1$ determiner 530, a security parameter λ 540, a setup unit 550, and a display unit 560.

The sign-in report retriever 510 in this example may transmit a sign-in report request to the server 330 and receive the requested sign-in report from the server. The sign-in report retriever 510 may further transmit the sign-in report to the signature length $L_1$ determiner 530.

The client location retriever 520 in this example may transmit a client device location request to the client device 320 and receive the location of the client device 320. The client location retriever 520 may further transmit the location of the client device 320 to the signature length $L_1$ determiner 530.

The signature length $L_1$ determiner 530 in this example may receive the security parameter λ and at least one of the sign-in report from the sign-in report retriever 510, the current location of the client device from the client device location retriever 520, and an input of the signature $L_1$, for example, directly from an IT administrator of the client device 320 or the application installed in the client device 320. The signature length $L_1$ determiner 530 may further adjust the signature length $L_1$ determiner 530 based on the security parameter λ and at least one of the sign-in report and the location of the client device 320. Alternatively, the signature length $L_1$ determiner 530 may further adjust the signature length $L_1$ according to the direct input from the IT administrator. After the adjustment of the signature length $L_1$, the signature length $L_1$ determiner 530 may transmit the adjusted signature length $L_1$ to the setup unit 550, and optionally the client device 320.

The setup unit 550 may receive the adjusted signature length $L_1$ from the signature length $L_1$ determiner 530 and execute a setup algorithm to generate signing key $S_k$, a signature $σ_0$, a and a verification key $V_k$. The sign-in key $S_k$ includes the signature length $L_1$ and a random key, K, for a pseudorandom function. The signature $σ_0$ is generated based on the signing key $S_k$. For example, the signature $σ_0$ may be calculated as $g(S_k)$, where g is a pseudorandom function. The verification key $V_k$ may be generated based on the signing key $S_k$ and the signature $σ_0$. In an embodiment, the verification key $V_k$ is an obfuscation of the computer program in table 1. In addition, the setup unit 550 is configured to transmit the signature $σ_0$ to the user, for example, via a text signature, an email, or a voice signature. Alternatively or in addition, the setup unit 550 may transmit the signature $σ_0$ to the display unit. Further, the setup unit 550 may further transmit the verification key $V_k$ to the server 330.

The display unit 560 may display the signature $σ_0$ to the user so that the user may sign in the client device 320 or the application installed in the client device 320 with the signature $σ_0$.

Figure 6:
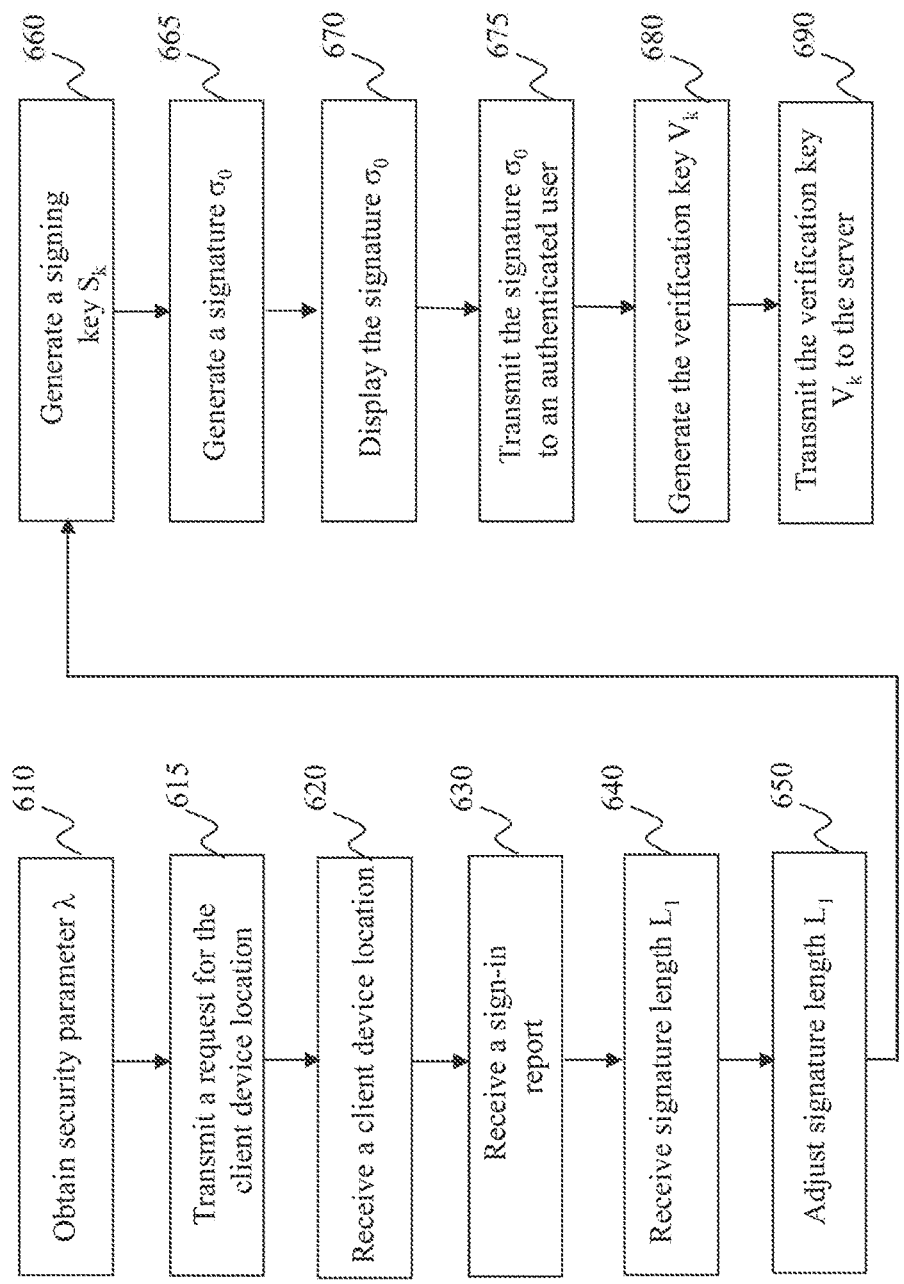
FIG. 6 is a flowchart of an adjustable OTP setup process performed by the setup tool, according to an embodiment of the present teaching.

FIG. 6 is a flowchart of an adjustable OTP setup process performed by the setup tool 310, according to an embodiment of the present teaching. At step 610, the security parameter λ is obtained, for example, from an IT administrator of the client device 320 or the application installed in the client device 320. At step 615, a request for the client device location is transmitted, for example, to the client device 320. At step 620, the client device location is received, for example, from the client device 320. At step 630, a sign-in report of the client device 320 or the application installed in the client device 320 is received, for example, from the server 330. At step 640, a signature length $L_1$ is received, for example, as an input from a user. It should be noted only one of the steps 620-640 may be performed to implement the adjustable OTP setup process.

At step 650, the signature length $L_1$ is adjusted, for example, according to the received signature length parameter $L_1$. Alternatively, at step 650, the signature length $L_1$ is adjusted based on the security parameter λ and at least one of the client device location and the sign-in report as described above. At step 660, the signing key $S_k$ is generated. The sign-in key $S_k$ includes the signature length $L_1$ and a random key, K, for a pseudorandom function. At step 665, the signature $σ_0$ is generated based on the signing key $S_k$. For example, the signature $σ_0$ may be calculated as $g(S_k)$, where g is a pseudorandom function.

The signature $σ_0$ is displayed at step 670 to the user so that the user may sign in the client device 320 or the application installed in the client device 320 using the signature $σ_0$. In addition or alternatively, the signature $σ_0$ may be transmitted to an authenticated user by means of an email, a text signature, or a voice signature at step 675. At step 680, a verification key $V_k$ is generated based on the signing key $S_k$ and the signature $σ_0$. In an embodiment, the verification key $V_k$ is an obfuscation of the computer program in table 1. At step 690, the verification key $V_k$ is transmitted to the server 330 through the network.

Figure 7:
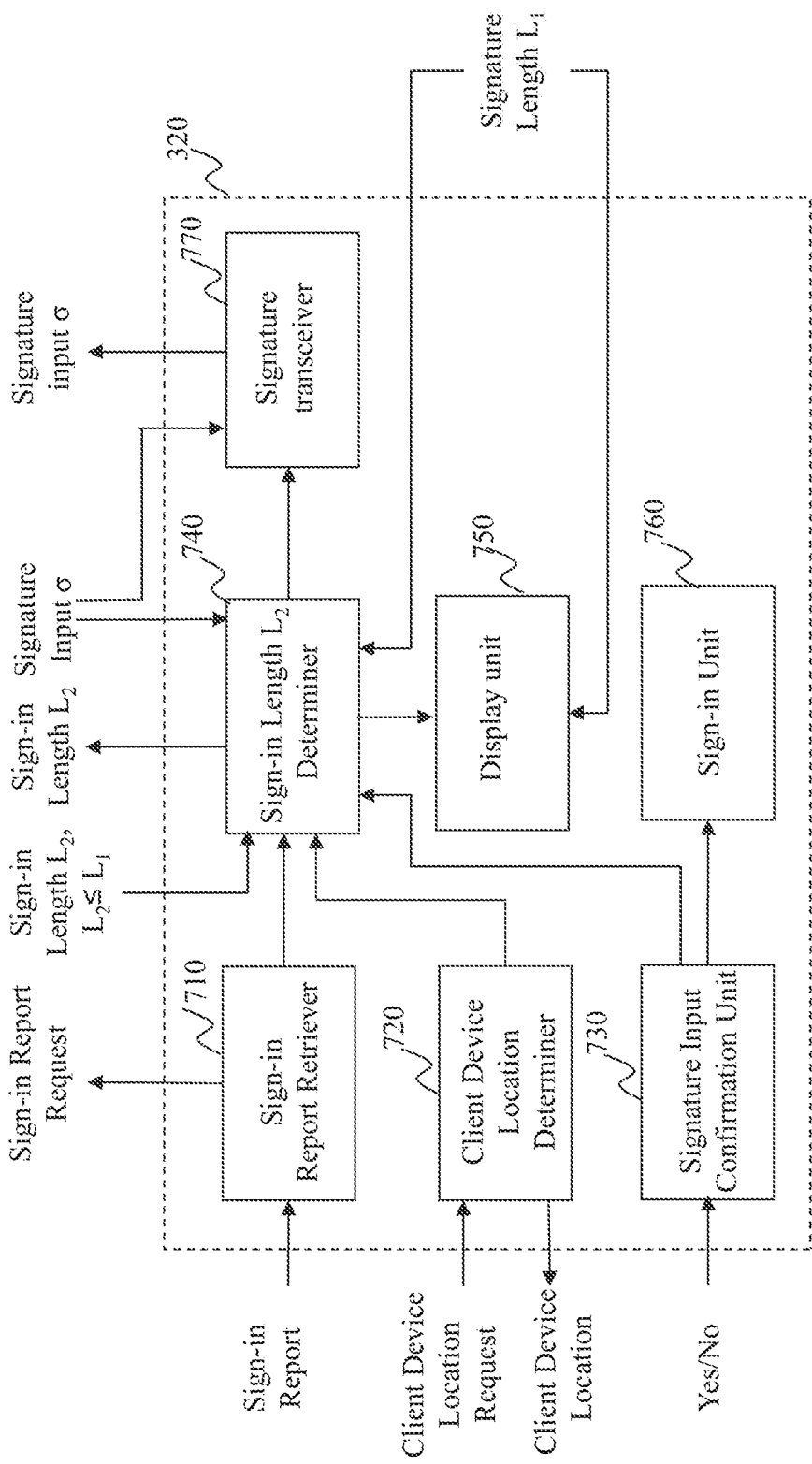
FIG. 7 illustrates a diagram of a client device, according to an embodiment of the present teaching.

FIG. 7 illustrates a diagram of the client device 320, according to an embodiment of the present teaching. As shown in FIG. 7, the client device 320 in this example includes a sign-in report retriever 710, a client device location determiner 720, a signature input confirmation unit 730, a sign-in length $L_2$ determiner 740, a display unit 750, a sign-in unit 760, and a signature transceiver 770.

The sign-in report retriever 710 in this example may transmit a sign-in report request to the server 330 and receive the requested sign-in report from the server 330. The sign-in report retriever 710 may further transmit the sing-in report to the sign-in length $L_2$ determiner 740.

The client device location determiner 720 in this example may receive a client device location request from the setup tool 310 and/or the server 330 and transmit the client device location to the setup tool 310 and/or the server 330 following receipt of the client device location request. The client device location determiner 720 may further transmit the client device location to the sign-in length $L_2$ determiner 740.

The sign-in length $L_2$ determiner 740 in this example may receive the signature length $L_1$ from the setup tool 310, and at least one of the sign-in report from the sign-in report retriever 710, the client device location from the client device location determiner 720, the sign-in length $L_2$ directly as an input from an IT administrator of the client device 320 or the application installed in the client device 320, and the signature input σ from a user. The sign-in length $L_2$ determiner 740 may further adjust the sign-in length $L_2$ based on what it receives and transmit the adjusted sign-in length $L_2$ to the signature σ calculator 770 and optionally the display unit 750. In an embodiment, the sign-in length $L_2$ determiner 740 may adjust the sign-in length $L_2$ according to the input from the IT administrator of the client device 320 or the application installed in the client device 320. The sign-in length $L_2$ may further transmits the adjusted sign-in length $L_2$ to the signature σ calculator 770 and the display unit 750. In an embodiment, the sign-in length $L_2$ determiner 740 may receive the signature input σ after the display unit 750 displays the signature length $L_1$, and requests for the signature input σ with a length of no greater than $L_1$. The sign-in length $L_2$ determiner 740 further adjusts the sign-in length $L_2$ as the length of the signature σ and transmits the adjusted sign-in length $L_2$ to the signature σ calculator 770. In an embodiment, the sign-in length $L_2$ determiner 740 may adjust the sign-in length $L_2$ based on the signature length $L_1$ and at least one of the sign-in report from the sign-in report retriever 710 and the client device location from the client device location determiner 720 as described in FIG. 3 and FIG. 4. After the adjustment of the sign-in length $L_2$, the sign-in length $L_2$ determiner 740 may further transmit the sign-in length $L_2$ to the signature σ calculator 770 and the display unit 750.

The display unit 750 in this example may display the signature length $L_1$ and/or the sign-in length $L_2$.

The signature transceiver 770 is configured for receiving the signature input σ from the user and optionally the sign-in length $L_2$ from the sign-in length $L_2$ determiner 740. The signature transceiver 770 is further configured for transmitting the signature input σ to the server 330.

The signature input confirmation unit 730 may receive the verification result ("Yes/No") from the server. When the verification result is "Yes" indicating the user passes identity verification, the signature input confirmation unit 730 may inform the sign-in unit 760 to sign in the client device 320 and/or the application installed in the client device 320. Otherwise, the signature input confirmation unit 730 may inform the sign-in length $L_2$ determiner 740 of the verification result, which may further request the user to enter a new signature input σ with the same sign-in length $L_2$ if the user wants to try again. Alternatively, the signature input confirmation unit 730 may request the sign-in length $L_2$ determiner 740 to adjust the sign-in length $L_2$ (e.g., increase the sign-in length $L_2$). Accordingly, the user may need to enter a new signature input σ with an increased sign-in length $L_2$ in order to sign in the client device 320 or the application installed in the client device 320.

The sign-in unit 760 may sign in the client device 320 and/or the application installed in the client device 320 when the verification decision indicates the user passes the identity verification.

Figure 8:
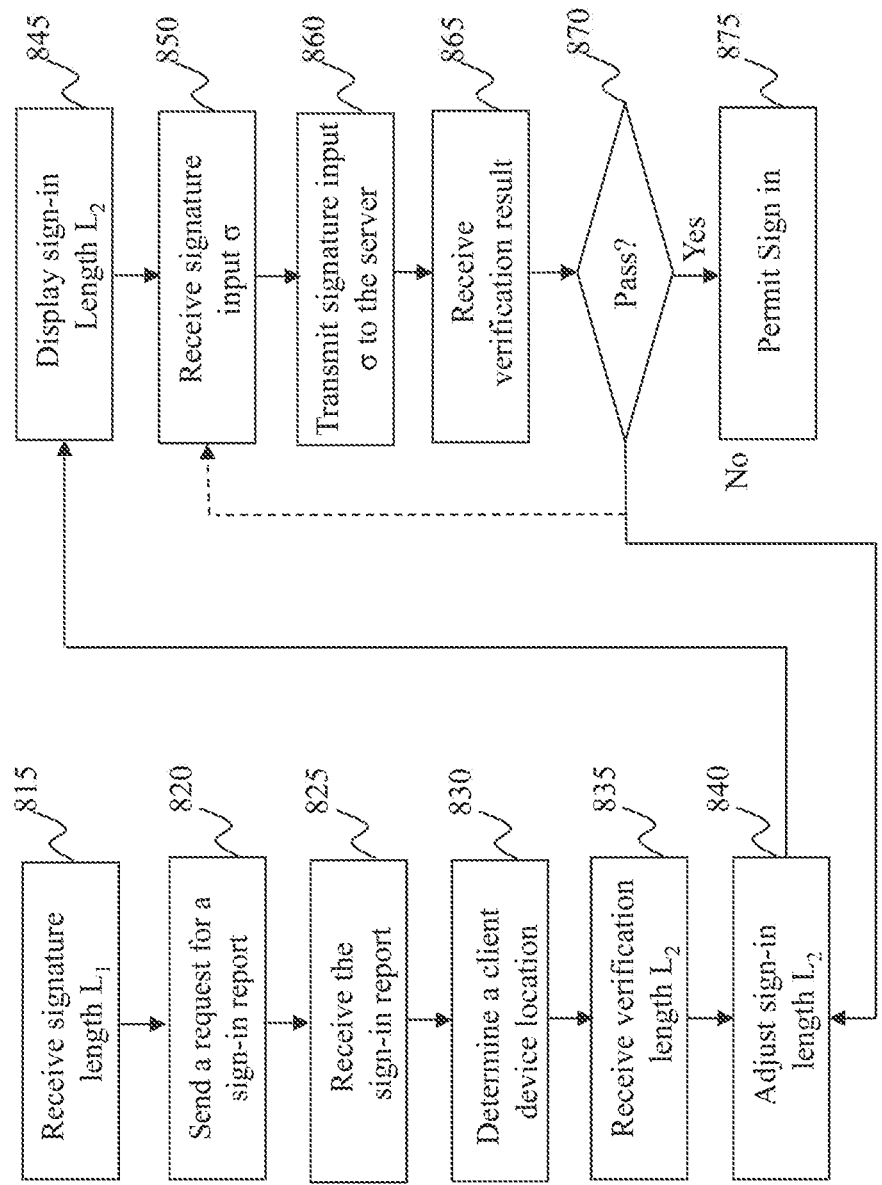
FIG. 8 is a flowchart of an adjustable OTP sign-in process performed by the client device, according to an embodiment of the present teaching.

FIG. 8 is a flowchart of an adjustable OTP sign-in process performed by the client device 320, according to an embodiment of the present teaching. At step 815, the signature length $L_1$ is received, for example, from the setup tool 310. At step 820, a request for a sign-in report is sent to the server 330. At step 825, the requested sign-in report is received from the server following transmission of the request. At step 830, the client device location is determined, for example, by analyzing the internet protocol (IP) address of the client device 320 or by other suitable means. At step 835, The sign-in length $L_2$ is received, for example, directly as an input from the IT administrator of the client device 320 or the application installed in the client device 320. At step 840, the sign-in length $L_2$ is adjusted. For example, the sign-in length $L_2$ may be adjusted according to the received sign-in length $L_2$ from the IT administrator at step 835. For another example, the sign-in length $L_2$ may be adjusted based on the signature length $L_1$ and at least one of the sign-in report and the client device location.

At step 845, the signing length $L_2$ is displayed, for example, on a display screen of the client device 320. At step 850, the signature input σ is received from the user. The signature input σ has a length of $L_2$. At step 860, the signature σ is transmitted to the server 330. At step 865, a verification result ("Yes/No") is received from the server 330. At step 870, it is determined whether the verification result indicates the user passes the identity verification or not. When the verification result is "Y" indicating the user passes the identity verification, the process proceeds to step 875, where the user may sign in the client device 320 or the application installed in the client device 320. Otherwise, the process may proceed to step 840, where the user may need to enter a new signature input σ with an increased sign-in length $L_2$ in order to sign in the client device 320 or the application installed in the client device 320. Alternatively, the process may proceed to step 850, where the user may need to enter a new signature input σ with the same sign-in length $L_2$.

Figure 9:
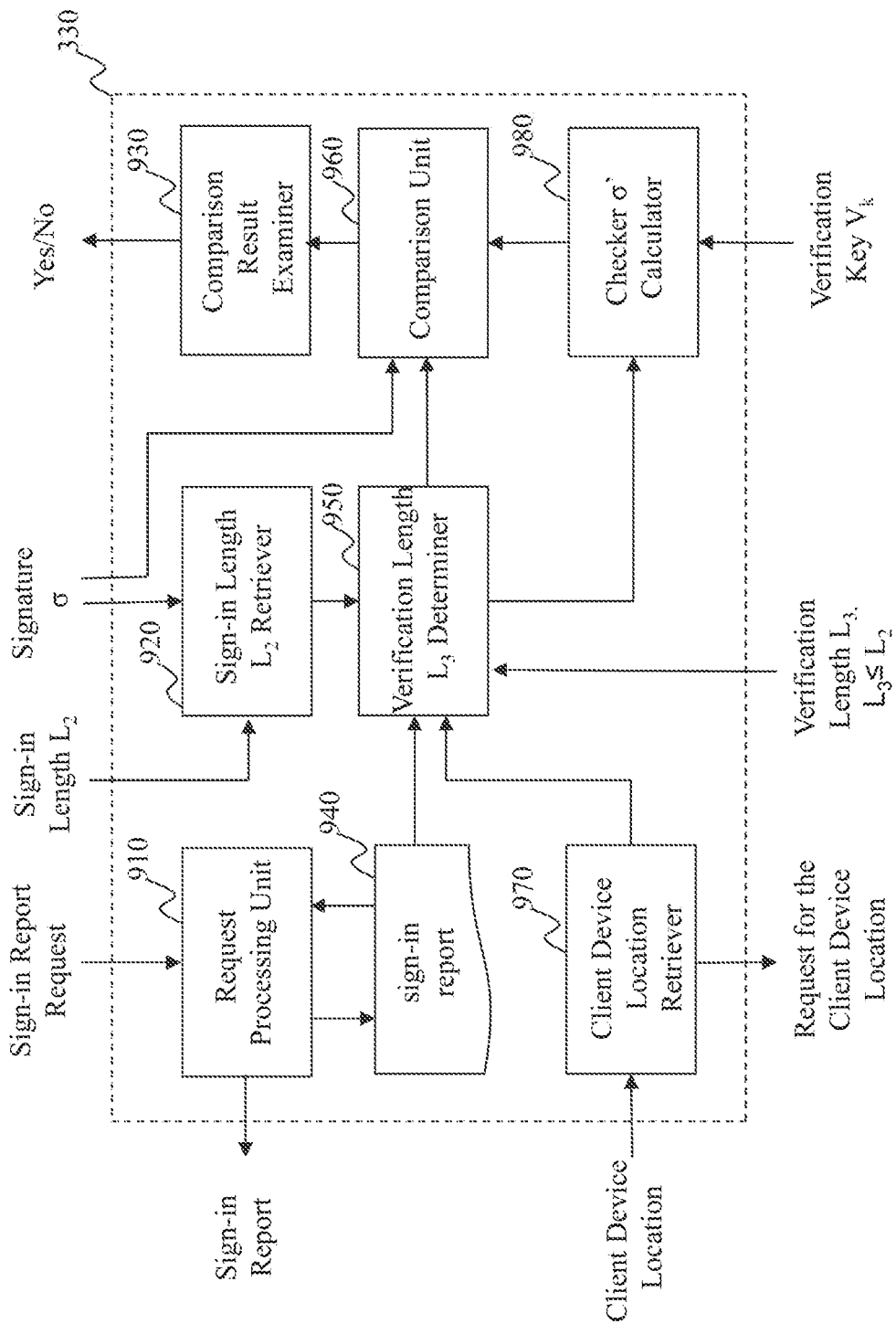
FIG. 9 illustrates a diagram of a server, according to an embodiment of the present teaching.

FIG. 9 illustrates a diagram of the server 330, according to an embodiment of the present teaching. As shown in FIG. 9, the server 330 in this example includes a request processing unit 910, a sign-in report 940, a client device location retriever 970, a sign-in length $L_2$ retriever 920, a verification length $L_3$ determiner 950, a comparison result examiner 930, a comparison unit 960, and a checker σ' calculator 980.

The request processing unit 910 in this example may receive a sign-in report request from the setup tool 310 and/or the client device 320. Following receipt of the sign-in report request, the request processing unit 910 may further fetch the sign-in report 940 and transmit the sign-in report 940 to the setup tool 310 and/or the client device 320.

The client device location retriever 970 in this example may transmit a client device location request to the client device 320 and receive the client device location from the client device 320. The client device location retriever 970 may further transmit the client device location to the verification length $L_3$ determiner 950.

The sign-in length $L_2$ retriever 920 may determine the sign-in length $L_2$ by receiving the sign-in length $L_2$ directly from the client device 320. Alternatively, the sign-in length $L_2$ retriever 920 may receive the signature σ from the client device 320 and retrieve the sign-in length $L_2$ as the length of the signature σ. After determination of the sign-in length $L_2$, the sign-in length $L_2$ retriever 920 may forward the sign-in length $L_2$ to the verification length L3 determiner 950.

The verification length $L_3$ determiner 950 in this example may receive the sign-in length $L_2$ from the sign-in length $L_2$ retriever 920 and at least one of the sign-in report 940, the client device location from the client device location retriever 970, and the verification length $L_3$ directly from the setup tool 310 input by the IT administrator of the client device 320 or the application installed in the client device 320. The verification length $L_3$ determiner 950 may further adjust the verification length $L_3$ based on what it receives and transmits the adjusted verification length $L_3$ to the comparison unit 960 and the checker σ' calculator 980. For example, the verification length $L_3$ determiner 950 may adjust the verification length $L_3$ according to the received verification length $L_3$ from the client device 320. For another example, the verification length $L_3$ determiner 950 may adjust the verification length $L_3$ based on the sign-in length $L_2$ from the sign-in length $L_2$ retriever 920 and at least one of the sign-in report 940 and the client device location from the client device location retriever 970 as described in FIG. 3 and FIG. 4.

The checker σ' calculator 980 in this example may receive the verification key $V_k$ from the setup tool 310 and the adjusted verification length $L_3$ from the verification length $L_3$ determiner 950. Following receipt of the verification key $V_k$ and the verification length $L_3$, the checker σ' calculator 980 may calculate the checker σ' based on the verification key $V_k$ and the adjusted verification length $L_3$. For example, the checker σ' may be calculated by σ'=$V_k(L_3)$=$g(S_k)|L_3$. The checker σ' calculator 980 may further transmit the checker σ' to the comparison unit 960.

The comparison unit 960 in this example may receive the signature a from the client device 320, the verification length $L_3$ from the verification length $L_3$ determiner 950, and the checker σ' from the checker σ' calculator 980. The comparison unit 960 may further compare the checker σ' with at least a portion of the signature σ with a length of $L_3$ (e.g., the first $L_3$ bits or characters of the signature σ, the last $L_3$ bits or characters of the signature σ, or other $L_3$ bits or characters of the signature σ according to a predetermined rule), and send the comparison result to the comparison result examiner 930.

The comparison result examiner 930 in this example may receive the comparison result from the comparison unit 960, determine whether the signature input a passes the verification based on the comparison result, and transmit the verification decision ("Yes/No") to the client device 320. When the comparison result indicates the checker σ' does not match the portion of the signature σ with the length of $L_3$, the verification decision may be "Yes" meaning the user passes the identity verification. Otherwise, the verification decision may be "No" meaning the user fails the identity verification.

Figure 10:
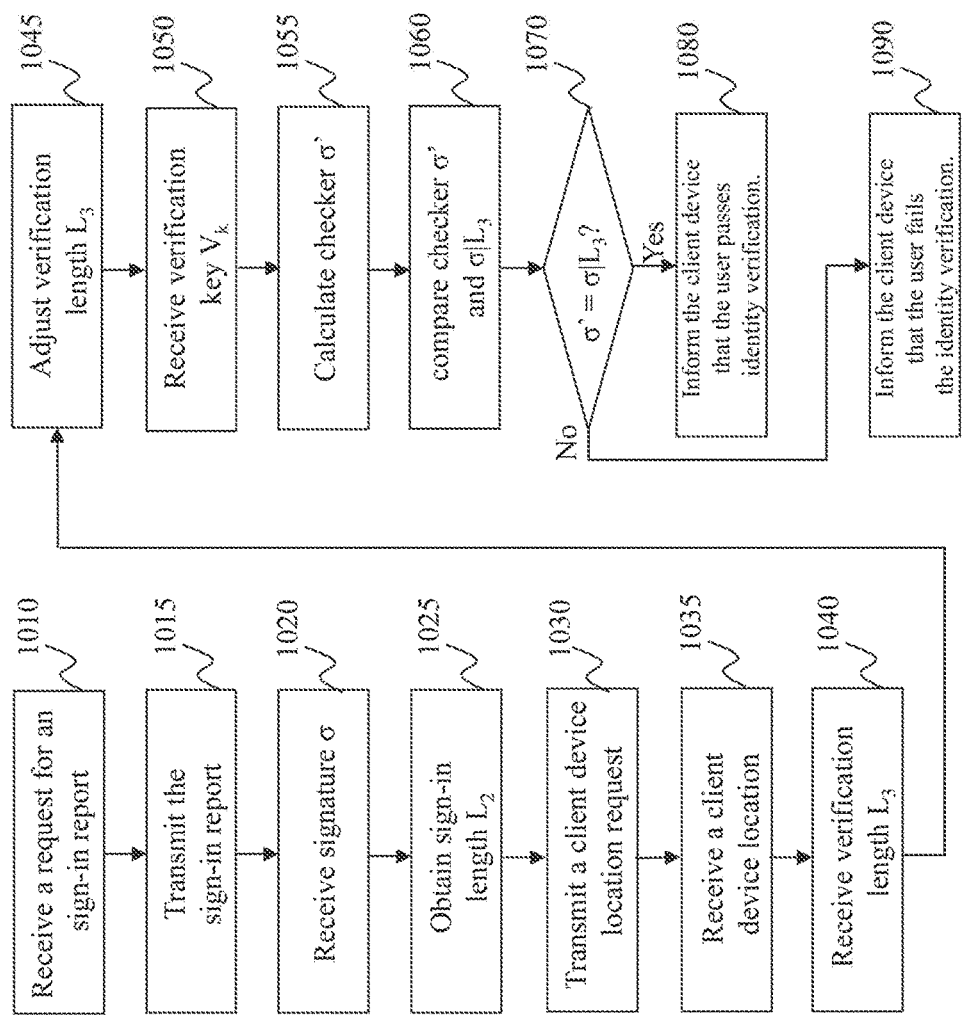
FIG. 10 is a flowchart of an adjustable OTP verification process performed by the server, according to an embodiment of the present teaching.

FIG. 10 is a flowchart of an adjustable OTP verification process performed by the server 330, according to an embodiment of the present teaching. At step 1010, a request for the sign-in report is received, for example, from the setup tool 310 and/or the client device 320. At step 1015, the sign-in report is transmitted to the setup tool 310 and/or the client device 320 following receipt of the request. At step 1020, the signature σ is received, for example, from the client device 320. At step 1025, the sign-in length $L_2$ is obtained. For example, the sign-in length $L_2$ may be received directly from the client device 320. For another example, the sign-in length $L_2$ may be retrieved as the length of the signature σ.

At step 1030, a request for the client device location is transmitted, for example, to the client device 320. At step 1035, the client location is received, for example, from the client device 320. At step 1040, the verification length $L_3$ is received, for example, directly from the setup tool input by the IT administrator of the client device 320 or the application installed in the client device 320. At step 1045, the verification length $L_3$ is adjusted. For example, the verification length $L_3$ is adjusted according to the received verification length $L_3$. For another example, the verification length $L_3$ is adjusted based on the sign-in length $L_2$ and at least one sign-in report stored in the server 330 and the client device location as described in FIG. 3 and FIG. 4. At step 1050, the verification key $V_k$ is received, for example, from the setup tool 310. At step 1055, the checker σ' is calculated according to the verification key $V_k$ and the verification length $L_3$. For example, the checker σ' may be calculated by σ'=$V_k(L_3)$=$g(S_k)|L_3$. At step 1060, the checker σ' and at least a portion of the signature σ having the length of $L_3$ is compared. At step 1070, it is determined whether the checker σ' matches the portion of the signature σ with the length of $L_3$. When the checker σ' matches the portion of the signature σ with the length of $L_3$, a verification decision is transmitted to the client device indicating the user passes the identity verification at step 1080. Otherwise, the verification decision is transmitted to the client device indicating the user fails the identity verification at step 1090.

Figure 11:
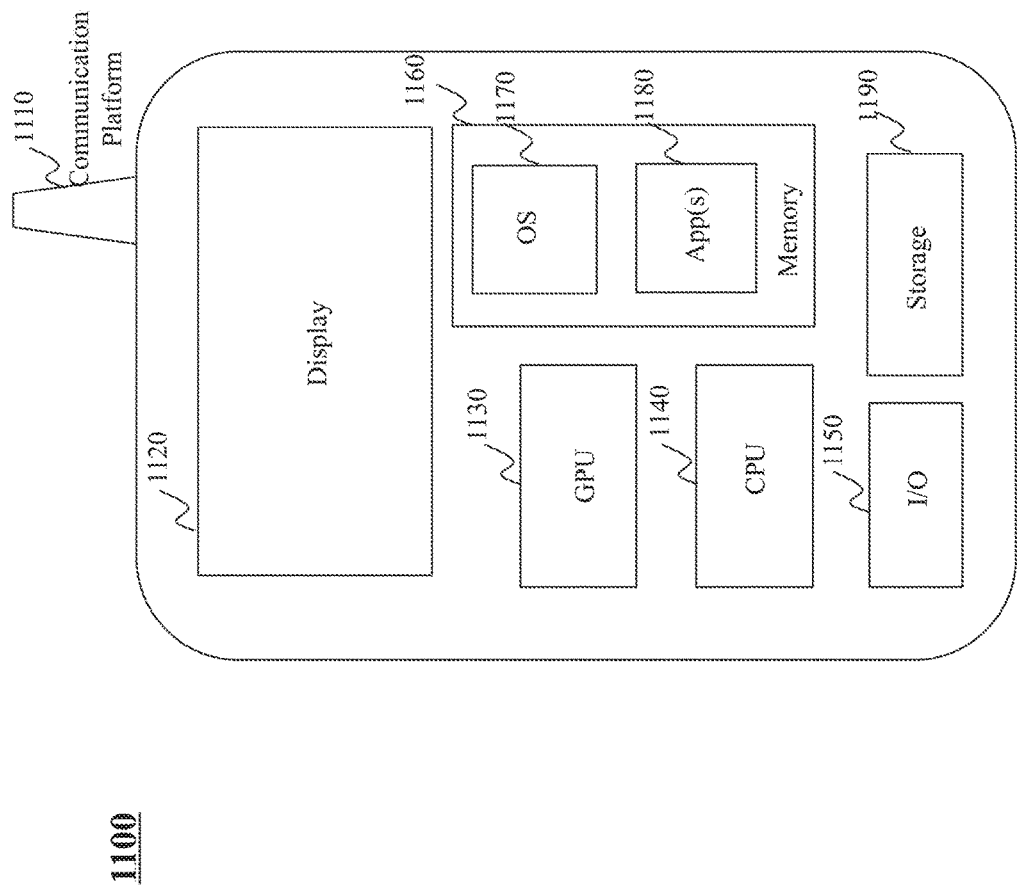
FIG. 11 depicts the architecture of a mobile device which can be used to implement a specialized system incorporating the present teaching.

FIG. 11 depicts the architecture of a mobile device which can be used to realize a specialized system implementing the present teaching. In this example, the client device 320 is a mobile device 1100, including, but not limited to, a smart phone, a tablet, a music player, a handled gaming console, a global positioning system (GPS) receiver, and a wearable computing device (e.g., eyeglasses, wrist watch, etc.), or in any other form factor. The mobile device 1100 in this example includes one or more central processing units (CPUs) 1140, one or more graphic processing units (GPUs) 1130, a display 1120, a memory 1160, a communication platform 1110, such as a wireless communication module, storage 1190, and one or more input/output (I/O) devices 1150. Any other suitable component, including but not limited to a system bus or a controller (not shown), may also be included in the mobile device 1100. As shown in FIG. 11, a mobile operating system 1170, e.g., iOS, Android, Windows Phone, etc., and one or more applications 1180 may be loaded into the memory 1160 from the storage 1190 in order to be executed by the CPU 1110. User interactions with the device 1100 may be achieved via the I/O devices 1150.

To implement various modules, units, and their functionalities described in the present disclosure, computer hardware platforms may be used as the hardware platform(s) for one or more of the elements described herein (e.g., the setup tool 310, the client device 320, and the server 330 described with respect to FIGS. 1-10). The hardware elements, operating systems and programming languages of such computers are conventional in nature, and it is presumed that those skilled in the art are adequately familiar therewith to adapt those technologies for adjustable OTP setup, sign-in, and verification as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 12:
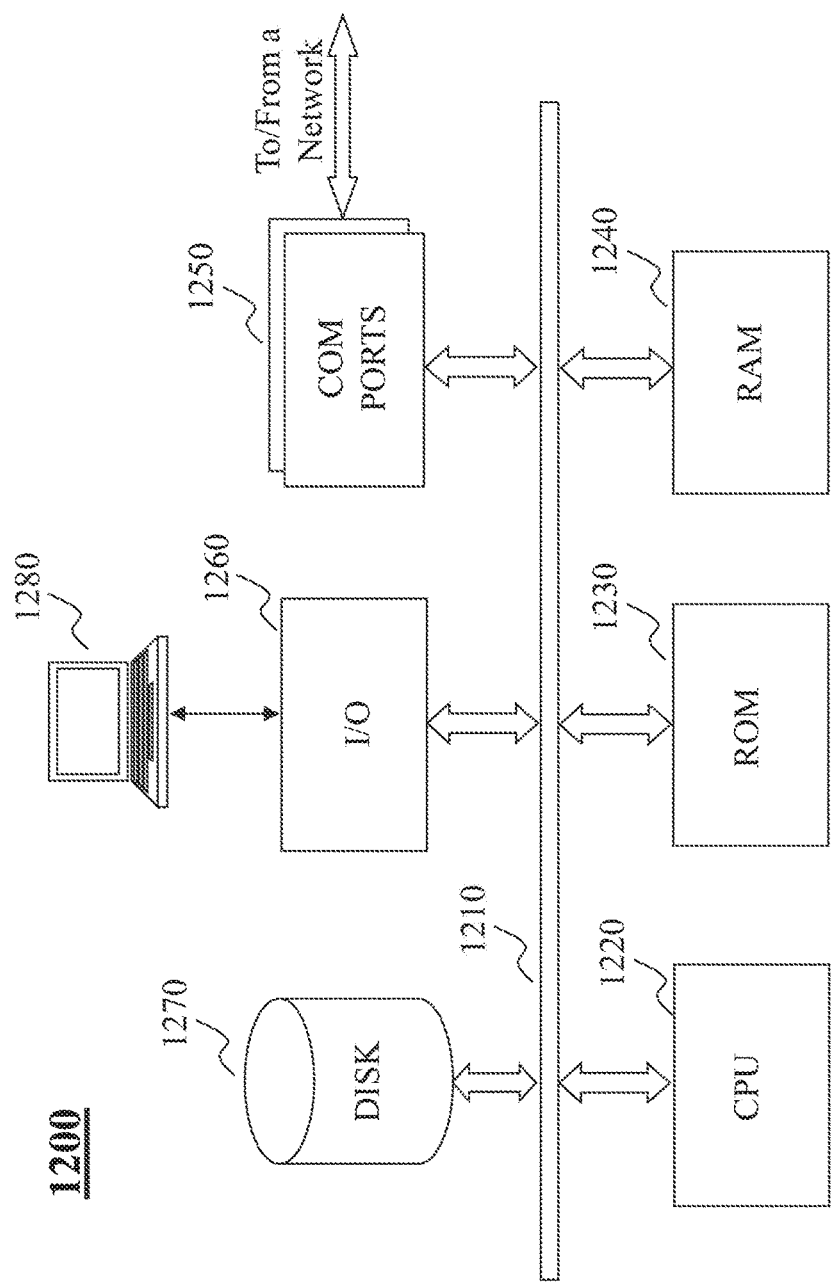
FIG. 12 depicts the architecture of a computer which can be used to implement a specialized system incorporating the present teaching.

FIG. 12 depicts the architecture of a computer which can be used to realize a specialized system implementing the present teaching. Such a specialized system incorporating the present teaching has a functional block diagram illustration of a hardware platform which includes user interface elements. The computer 1200 may be a general purpose computer or a special purpose computer. Both can be used to implement a specialized system for the present teaching. This computer 1200 may be used to implement any component of the adjustable OTP setup, sign-in, and verification scheme, as described herein. For example, the setup tool 310, the client device 320 and the server 330 may be implemented on a computer such as computer 1200, via its hardware, software program, firmware, or a combination thereof. Although only one such computer is shown, for convenience, the computer functions relating to the OTP setup, sign-in, and verification as described herein may be implemented in a distributed fashion on a number of similar platforms, to distribute the processing load.

The computer 1200, for example, includes COM ports 1250 connected to and from a network connected thereto to facilitate data communications. The computer 1200 also includes a central processing unit (CPU) 1220, in the form of one or more processors, for executing program instructions. The exemplary computer platform includes an internal communication bus 1210, program storage and data storage of different forms, e.g., disk 1270, read only memory (ROM) 1230, or random access memory (RAM) 1240, for various data files to be processed and/or communicated by the computer, as well as possibly program instructions to be executed by the CPU. The computer 1200 also includes an I/O component 1260, supporting input/output flows between the computer and other components therein such as user interface elements 1280. The computer 1200 may also receive programming and data via network communications.

Hence, aspects of the methods of adjustable OTP setup, sign-in, and verification, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from one device into the hardware platform(s) of a computing environment or other system implementing a computing environment or similar functionalities in connection with key exchange techniques. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the key exchange as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform connected to a network for identity verification, the method comprising:

determining, at a first device, a first length of a signature, wherein the signature has been used previously by a first user to initially sign-in a second device;

determining, at the first device, a second length of the signature that is different from the first length, wherein the second length of the signature is determined based on a report including information of unauthorized accesses of the second device and a parameter associated with the second device;

generating a signing key based on the second length of the signature;

generating a new signature having the second length of the signature based on the signing key;

providing the new signature to a second user so that the second user can input a portion of the new signature into the second device for a subsequent sign in;

generating a verification key based on the new signature; and transmitting the verification key to a third device to enable the third device to verify the second user based on the verification key and the portion of the new signature input by the second user into the second device.

2. The method of claim 1, wherein the determining, at the first device, the second length that is different from the first length comprises determining, at the first device, the second length according to an input by a third user, wherein the second length is different from the first length.

3. The method of claim 2, wherein the first user is the same as the second user, and the third user is an information technology (IT) administrator of the second device.

4. The method of claim 1, wherein the determining, at the first device, the second length that is different from the first length comprises:
   obtaining the parameter and a location of the second device; and
   determining the second length based on the location of the second device, wherein the second length is different from the first length and is no greater than the parameter.

5. The method of claim 1, wherein the determining, at the first device, the second length that is different from the first length comprises:
   obtaining the parameter and the report of the second device; and
   determining the second length based on the report and the parameter, wherein the second length is different from the first length and is no greater than the parameter.

6. The method of claim 1, wherein the providing the new signature to the second user comprises displaying the new signature on a display screen of the first device.

7. The method of claim 1, wherein the providing the new signature to the second user comprises transmitting the new signature to the second user via at least one of an electronic mail (Email), a text signature, and a voice mail.

8. The method of claim 1, wherein the verification key is different than the signing key.

9. The method of claim 1, wherein the second user inputs a first portion of the new signature into the second device for a subsequent sign in, and the third device verifies the second user based on the verification key and a second portion of the new signature, wherein the second portion is less than the first portion of the new signature.

10. A system, having at least one processor, storage, and a communication platform connected to a network for identity verification, the system comprising:
   a signature length determiner configured for:
      determining a first length of a signature, wherein the signature has been used previously by a first user to initially sign-in a first device; and
      determining a second length of the signature that is different from the first length wherein the second length of the signature is determined based on a report including information of unauthorized accesses of the first device and a parameter associated with the second device;
   a setup unit configured for:
      generating a signing key based on the second length of the signature;
      generating a new signature having the second length of the signature based on the signing key;
      providing the new signature to a second user so that the second user can input a portion of the new signature into the first device for a subsequent sign in;
      generating a verification key based on the new signature; and
      transmitting the verification key to a second device to enable the second device to verify the second user based on the verification key and the portion of the new signature input by the second user into the first device.

11. The system of claim 10, wherein the determining the second length that is different from the first length comprises determining the second length according to an input by a third user, wherein the second length is different from the first length.

12. The system of claim 11, wherein the first user is the same as the second user, and the third user is an information technology (IT) administrator of the first device.

13. The system of claim 10, wherein the determining the second length that is different from the first length comprises:
   obtaining a security parameter and a location of the first device; and
   determining the second length based on the location of the first device, wherein the second length is different from the first length and is no greater than the security parameter.

14. The system of claim 10, wherein the determining the second length that is different from the first length comprises:
   obtaining the parameter and the report of the first device; and
   determining the second length based on the report and the security parameter, wherein the second length is different from the first length and is no greater than the parameter.

15. The system of claim 10, wherein the providing the new signature to the second user comprises transmitting the new signature to the second user via at least one of an electronic mail (Email), a text signature, and a voice mail.

16. The system of claim 10, wherein the system further comprises a display configured for displaying the new signature to the second user.

17. A method, implemented on a machine having at least one processor, storage, and a communication platform connected to a network for identity verification, the method comprising:
   obtaining, by a first device, a first length of a signature generated by a second device based on a signing key;
   determining a second length of the signature different from the first length of the signature, the second length being determined based on a report including information of unauthorized accesses of the first device and a parameter associated with the first device;
   receiving a portion of the signature from a user having the second length of the signature; and
   transmitting the portion of the signature to a third device to enable the third device to verify the user based on a verification key provided by the second device and the portion of the signature.

18. The method of claim 17, further comprising:
   receiving a verification decision from the third device; and
   permitting the user to sign in the first device when the verification decision indicates the user passes the identity verification.

19. The method of claim 17, wherein the determining, by the first device, the second length based on the first length comprises determining the second length according to a user input, and wherein the second length is less than the first length.

20. The method of claim 17, wherein the determining, by the first device, the second length based on the first length comprises:
   obtaining a location of the first device; and
   determining the second length based on the location of the first device, wherein the second length is less than the first length.

21. The method of claim 17, wherein the determining, by the first device, the second length based on the first length comprises:
obtaining the report of the first device; and
determining the second length based on the report and the parameter of the first device, wherein second length is less than the first length.

22. The method of claim 17, wherein the providing the second length to the user comprises displaying the second length on the first device to the user.

23. The method of claim 17, wherein the providing the second length to the user comprises transmitting the new signature to the user via at least one of an electronic mail (Email), a text signature, and a voice mail.

24. A method, implemented on a machine having at least one processor, storage, and a communication platform connected to a network for identity verification, the method comprising:
receiving, at a first device, a verification key from a second device, wherein the verification key is generated by the second device based on a first signature, and wherein the first signature is generated by the second device and provided to a user;
receiving, from a third device, a second signature having a first length in accordance with the first signature, wherein the second signature is input by the user to the third device;
calculating a checker based on the verification key and a second length determined in accordance with the first length;
comparing the checker with a portion of the second signature to generate a comparison result, wherein the portion of the second signature has the second length, wherein the second length is determined based on a report including information of unauthorized accesses of the third device and a parameter associated with the third device; and
generating a verification result based on the comparison result.

25. The method of claim 24, wherein the verification result indicates the user passes the identity verification when the checker matches the portion of the second signature, and the verification result indicates the user fails the identity verification when the checker does not match the portion of the second signature.

26. The method of claim 24, further comprising transmitting the verification result to the third device.

27. The method of claim 24, further comprising determining the second length based on the first length following the receiving, from the third device, the second signature having the first length in accordance with the first signature.

28. The method of claim 27, wherein the determining the second length based on the first length comprises determining the second length according to a user input, wherein the second length is no greater than the first length.

29. The method of claim 27, wherein the determining the second length based on the first length comprises:
obtaining a location of the third device; and
determining the second length based on the location of the third device, wherein the second length is no greater than the first length.

30. The method of claim 27, wherein the determining the second length based on the first length comprises:
obtaining the report of the third device; and
determining the second length based on the report and the parameter of the third device, wherein the second length is no greater than the first length.

31. A machine-readable tangible and non-transitory medium having information for utility verification, wherein the information, when read by the machine, causes the machine to perform the following:
determining, at a first device, a first length of a signature, wherein the signature has been used previously by a first user to initially sign-in a second device;
determining, at the first device, a second length of the signature that is different from the first length, wherein the second length of the signature is determined based on a report including information of unauthorized accesses of the second device and a parameter associated with the second device;
generating a signing key based on the second length of the signature;
generating a new signature having the second length of the signature based on the signing key;
providing the new signature to a second user so that the second user can input a portion of the new signature into the second device for a subsequent sign in;
generating a verification key based on the new signature; and
transmitting the verification key to a third device to enable the third device to verify the second user based on the verification key and the portion of the new signature input by the second user into the second device.

* * * * *